United States Patent
Chan et al.

[11] Patent Number: 5,995,604
[45] Date of Patent: Nov. 30, 1999

[54] METHOD OF PREVENTING FRAUDULENT TOLL CALLS BY KEY SYSTEM USERS

[75] Inventors: Ken Yat-Wan Chan, Ottawa; Christoph U. Koch; Shirley-Ann Ivan-Milaknis, both of Kanata, all of Canada

[73] Assignee: Nortel Networks Corporation, Montreal, Canada

[21] Appl. No.: 08/880,173

[22] Filed: Jun. 20, 1997

[51] Int. Cl.[6] .................................................. H04M 17/00
[52] U.S. Cl. .......................... 379/145; 379/156; 379/157; 379/193
[58] Field of Search ........................... 379/145, 156–157, 379/159–160, 161, 177, 184, 187, 188–191, 199, 200, 201–202

[56] References Cited

U.S. PATENT DOCUMENTS

| | | |
|---|---|---|
| 4,001,513 | 1/1977 | Naylor . |
| 4,578,540 | 3/1986 | Borg et al. .............................. 379/200 |
| 4,811,378 | 3/1989 | Else et al. . |
| 4,873,682 | 10/1989 | Irwin et al. . |
| 4,885,767 | 12/1989 | Therrien . |
| 5,027,345 | 6/1991 | Littlewood et al. . |
| 5,392,335 | 2/1995 | Reeder . |
| 5,602,906 | 2/1997 | Phelps . |
| 5,694,461 | 12/1997 | Lee ......................................... 379/200 |

*Primary Examiner*—Curtis A. Kuntz
*Assistant Examiner*—Duc Nguyen
*Attorney, Agent, or Firm*—F. P. Turpin; Jeffrey M. Measures

[57] ABSTRACT

The invention provides a method and apparatus for the prevention of fraudulent toll calls by a user connected to a key telephone system. On recognition of a user request for use of a telephone line to make a call to a destination outside the key system, the forward speech path to the seized telephone line is muted. The string of digits dialed by the user are monitored and evaluated for correspondence to restrictions associated with the user terminal. If restrictions are failed, the call is terminated; otherwise, the forward speech path is unmuted and the call is allowed to proceed in the conventional manner. The invention may also provide an interdigital timer which is set upon reception of each dialed digit whereby if the timer is allowed to reset while the dialed digit string is being monitored, the call is terminated.

15 Claims, 4 Drawing Sheets

METHOD OF PREVENTING FRAUDULENT TOLL CALLS BY KEY SYSTEM USERS

FIELD OF THE INVENTION

This invention relates generally to digital key telephone systems and more particularly to a method of preventing toll fraud by a user of a key set attached to a digital key telephone system.

BACKGROUND OF THE INVENTION

Generally, very small telephone systems were generally referred to as key telephone systems. Characteristically, a key telephone system was provided by extensive telephone line and control lead wiring between the key telephone sets with each telephone line extending to a telephone switching office. Each of the key sets included a plurality of interlocking pushbuttons or keys each for connecting the telephone set to a particular telephone line among a plurality of telephone lines routed to each key telephone set. The switching function of line selection was mechanically provided and distributed among the key telephone sets. The primary advantages of these systems were economy with small size and robustness. However, these early systems were difficult to expand, required extensive cabling and were not compatible with the emerging world of digital switching and the associated ubiquitousnous of digital communications.

In the late 1980's and 1990's, a new generation of small switching systems were developed to be compatible with the existing world of digital telephony. One of the better-known and most successful of these systems is marketed under the name of Norstar™ by the Northern Telecom Company.

Architectural and functional information on the Norstar digital key telephone system may be obtained from U.S. Pat. No. 4,873,682 issued Oct. 10, 1989 to G. F. Irwin et al and U.S. Pat. No. 5,027,345 issued Jun. 25, 1991 to T. J. Littlewood; both patents are assigned to the same assignee as the present application and are hereby incorporated by reference. Yet other information on the Norstar system may be obtained from the publication "Telesis", 1989, two, published by Nortel Technology, the research arm of Northern Telecom Limited.

The Norstar system interfaces to the public switched telephone network (PSTN) via telephone lines in the usual manner of a telephone switch. The core of the system named KSU (Key Service Unit) in Norstar, has ports connected to telephone lines and to proprietary digital key sets via time-compression multiplex (TCM) links each carrying a pair of B-channels B1 and B2 at 64 kb/s and a D-channel at 16 kb/s. The telephone lines extending from the key system to a central office are often referred to as trunks since they connect two switches; therefore, the terms line and trunk are often used interchangeably in describing key systems.

The KSU can also be connected to a personal computer (PC) via one of its TCM ports. The physical and logical connection between the PC and the KSU is provided by a proprietary PC interface card that occupies one standard PC bus slot. Firmware in the PC interface card provides PC applications with access to both D-channel functional messaging and B-channel data. The PC communicates with the card via interrupts for the D-channel and direct memory access for large data transfers associated with the B-channel traffic.

By comparison with the electromechanical key switching systems, the new digital key switching systems are very sophisticated. However, a characteristic shared by both old and new systems presents a user with the opportunity of using a key station set fraudulently. The characteristic relates to the fact that when a user actuates a key on his set to request a line to a subtending central office (CO) of the PSTN, he causes the CO to allocate a subscriber line to be connected directly between itself and the key set. In the case of the Norstar system, one of the B-channels between the key set and the KSU and hence to the CO is allocated to the request and the user is effectively connected directly to a line circuit of the CO. This line seizure causes a DTMF (Dual Tone Multifrequency) receiver to be connected to the line appearance of the CO in anticipation of receiving dialed digits from the user. This situation allows a user who wishes to defraud the system to use a hand-held DTMF generator to dial digits for access to a remote location. This activity appears like a valid sequence to the CO and the user is able to remain connected for an unlimited duration and the KSU is only aware that the line has been successfully seized.

As mentioned above, contemporary key switching systems have become sophisticated and although they suffer from the key system characteristic described above, they, on the other hand, provide safeguards against misdialing and invalid dialing of destination numbers. This is achieved through the use of a restriction server which causes software routines to verify a dialing string of digits or requested feature codes against pre-programmed restrictions and exceptions. The restriction server parses the string of digits one digit at a time and the string is compared against all restrictions. If any one of the restrictions is failed, the parser will compare the current string against the corresponding exceptions. If no exception matches the string, restriction is considered as being failed and a functional message will be sent to the controller of the process to indicate this result. However, if the string of digits does not fail any of the restriction filters, then restrictions are considered passed and a corresponding message is generated.

Key systems are vulnerable to toll frauds partly because a restriction server normally assumes that restrictions are passed by default. A dialed number that has neither failed a restriction nor passed all restrictions explicitly will put the restriction server in a "parsing state". Since restrictions have not been failed explicitly, a user would still have a clear speech path to the CO. This situation thus provides a dialing "fraud window" to a perpetrator.

Fraudulent use of the telephone network has been prevalent over the years and a large amount of activity by network service providers has been directed at minimizing the effectiveness of the fraud perpetrator. Most of the fraudulent activity has been centered on the use of a "blue box" and/or "black box".

The use of a blue box is based on the situation whereby a caller pays for a local call while actually making a toll call. The blue box is basically the combination of a DTMF generator and a single-frequency generator operated manually in response to perceived single frequency signaling on the toll network. On the other hand, the use of a black box is based on "fooling" the toll billing system in believing that a toll call attempt was not successful whereas in actual fact, the call was answered. Whatever the equipment or method, a fraudulent call involves either avoiding or altering the billing record and charges for the call.

Many of the activities directed at mitigating if not altogether preventing the fraudulent use of the toll telephone network have resulted in numerous patents.

For example, U.S. Pat. No. 4,001,513 issued to the Northern Electric Company relies on the recognition of extraneous supervisory signals, generated in response to the use of a blue box, to detect a fraudulent toll call. U.S. Pat. No. 4,885,767 followed a similar detection technique to detect fraudulent calls.

U.S. Pat. No. 4,811,378 teaches an invention for detecting the results of using a blue box by monitoring the signaling activity in a toll office. A toll call is prevented from being set-up until answer supervision is received for a first attempted call.

Other detection of fraudulent practices in the toll network are described in U.S. Pat. Nos. 5,392,335 and 5,602,906; the methods vary respectively from the prevention of fraudulent toll calls that may be perpetrated through the use of telephone system adjunct processors such as voice messaging systems, to the detection of fraudulent toll calls using artificial intelligence and expert systems that detect "uncharacteristic" use of billing numbers.

The common characteristic of the known patents that teach the detection of blue or black boxes is that they rely on the effects of using those boxes; that is, they are directed at the detection of "non-normal" toll network signals that result from their use. None of the known patents teach a method for preventing the use of a hand-held DTMF generator to perpetrate fraudulent toll calls.

It is therefore an object of the invention to provide a method for mitigating the effective use of a hand-held tone generator by a subscriber to place fraudulent toll telephone calls.

It is a further object of the invention to prevent a key set user of a key telephone system from using a hand-held tone generator to place fraudulent toll calls.

SUMMARY OF THE INVENTION

In accordance with the invention, there is provided a method of preventing fraudulent toll calls by a key set user connected to a key telephone system, the system comprising a central switching unit having call processing elements, a first plurality of ports each of which is available for connection to a respective telephone line of a telephone switching facility, a second plurality of ports, each of which is available for connection of a user terminal thereto, each user terminal including an interface device for exchanging signals with the port in an operating signal format of the port, the central switching unit of the system comprising a messaging system for exchanging messages internally and externally with user terminals and telephone lines of the switching facility, a restriction server for parsing received digits dialed by a terminal user and comparing a received string of digits with pre-programmed restriction filters stored therein, the call processing elements comprising a network manager responsive to messages on a messaging bus for generating further messages and commands for setting-up and terminating calls, and a fraud monitor for controlling the fraud prevention process, the method comprising the steps of:

recognizing, from a user terminal, a message requesting the use of a telephone line to a switching facility;

determining the existence of at least one restriction filter associated with the user terminal that originated the use request of the telephone line;

if no restriction filter is associated with the requesting user terminal, processing the use request in the conventional manner;

if at least one restriction filter is associated with the user terminal that originated the use request, generating a message for activating a fraud prevention process comprising the further steps of:

at the central switching unit of the key system, allocating a speech path between the telephone line and a link to the user terminal requesting use of the telephone line and muting the forward speech path whereby the user is able to receive information from the switching facility but cannot transmit any information thereto;

monitoring a string of digits dialed by the user and evaluating whether or not the dialed digits meets the constraints of the restriction filters associated with the terminal; and if the constraints are met, allowing the call to proceed in the conventional manner and if the constraints are not met, terminating the call.

From another aspect, the invention provides a method of preventing fraudulent toll calls by a key set user connected to a key telephone system, the system comprising a central switching unit having call processing elements, a first plurality of ports each of which is available for connection to a respective telephone line of a telephone switching facility, a second plurality of ports, each of which is available for connection of a user terminal thereto, each user terminal including an interface device for exchanging signals with the port in an operating signal format of the port, the central switching unit of the system comprising a messaging system for exchanging messages internally and externally with user terminals and telephone lines of the switching facility, a restriction server for parsing received digits dialed by a terminal user and comparing a received string of digits with pre-programmed restriction filters stored therein, the call processing elements comprising a network manager responsive to messages on a messaging bus for generating control messages and commands for setting-up and terminating calls, and a fraud monitor for controlling the fraud prevention process, the method comprising the steps of:

recognizing, from a user terminal, a message requesting the use of a telephone line to a switching facility;

at the central switching unit of the key system, allocating a speech path between the telephone line and a link to the user terminal requesting use of the telephone line;

muting the forward speech path whereby the user is able to receive information from the switching facility but cannot transmit any information thereto; and on seizure of the telephone line and on reception of each dialed digit, setting an interdigital timer having a predetermined duration and if the timer is allowed to reset before an expected plurality of dialed digits is received, terminating the call.

From yet another aspect, the invention provides apparatus for preventing fraudulent toll calls by a key set user connected to a key telephone system, the system comprising a central switching unit having call processing elements, a first plurality of ports each of which is available for connection to a respective telephone line of a telephone switching facility, a second plurality of ports, each of which is available for connection of a user terminal thereto, each user terminal including an interface device for exchanging signals with the port in an operating signal format of the port, the central switching unit of the system comprising a messaging system for exchanging messages internally and externally with user terminals and telephone lines of the switching facility, a restriction server for parsing received digits dialed by a terminal user and comparing a received string of digits with pre-programmed restriction filters stored therein, the call processing elements comprising a network manager responsive to messages on a messaging bus for generating control messages and commands for setting-up and terminating calls, and a fraud monitor for controlling the fraud prevention process, means for recognizing a message from a user terminal requesting the use of a telephone line to a switching facility, means for determining the existence of at least one restriction filter associated with the user terminal that originated the use request of the telephone line, means for allocating a speech path between the telephone line and a link to the user terminal requesting use of the telephone line, means responsive to the determining means for muting the forward speech path if at least one restriction filter was determined to exist, the restriction server including means for monitoring a string of dialed digits and evaluating whether or not the dialed digits meet the constraints of the restriction filters associated with the use request, and means responsive to the monitoring and evaluating means for generating a first message allowing the call to proceed in the conventional manner if the constraints are met and a second message for terminating the call if the constraints are not met.

BRIEF DESCRIPTION OF THE DRAWINGS

Embodiments of the invention will now be described with reference to the accompanying drawings, in which.

and

Figure 4:
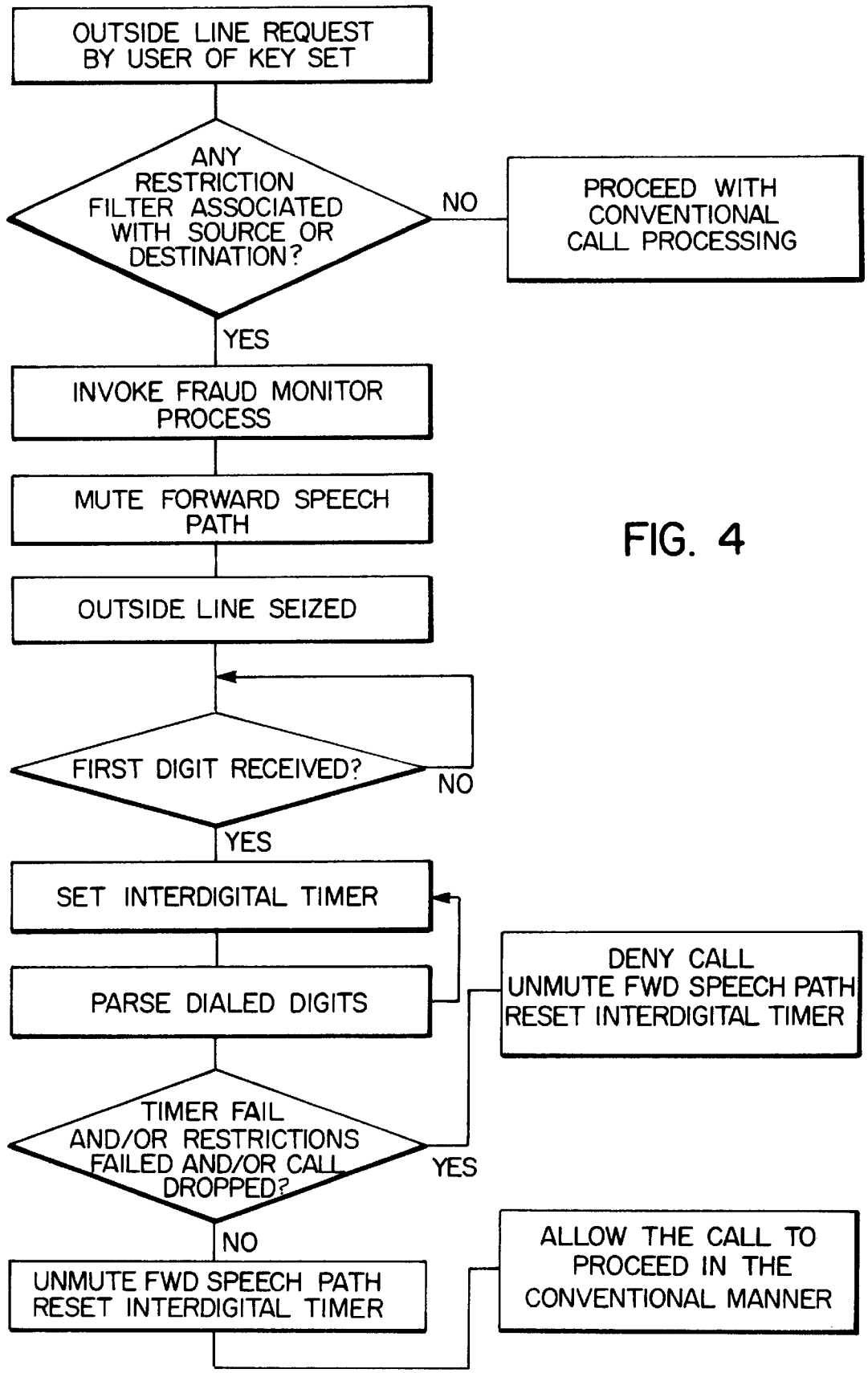

FIG. 4 is a sequence chart illustrating a toll fraud prevention method in accordance with the invention.

Figure 1:
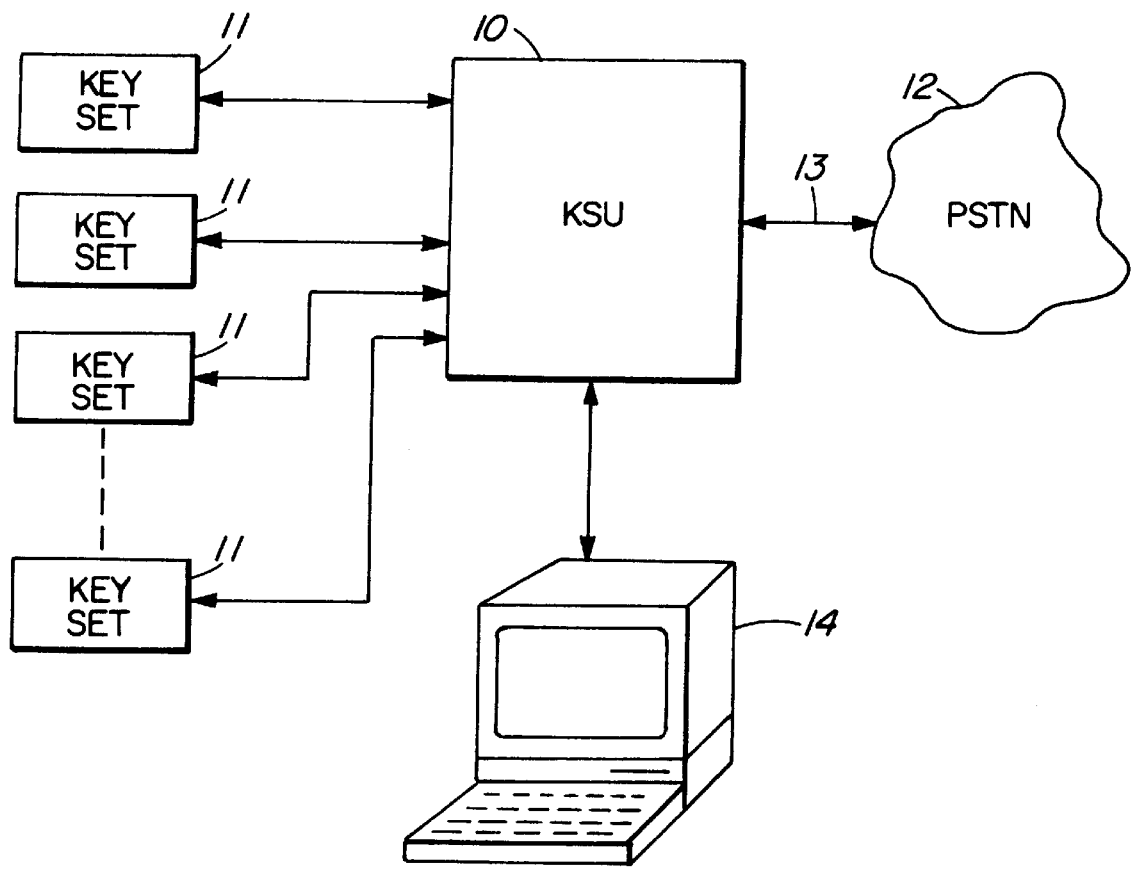
FIG. 1 is a generalized illustration of a contemporary key telephone system.

FIG. 1 illustrates a typical general architecture of a key telephone system, in this case, the Norstar system referred to above. The system comprises KSU 10 connected to a plurality of proprietary digital key sets 11. The KSU 10 contains the common system components such as power, control, and a non-blocking time switch. It also provides interfaces for connection to the Public Switched Telephone Network (PSTN) 12 via telephone lines 13 and may be connected to a personal computer 14. The processor and memory requirements for the KSU 10 are conventional and may use commercial processors as described in the above-identified patents and publications about the Norstar system. Read-only memory (ROM) holds the system software and non-volatile memory (NVRAM) is provided to hold permanent data such as configuration tables and settings of user preferences.

Each key set 11 is connected to the KSU 10 over a single twisted pair. This connection is fully digital using time compression multiplex (TCM) to carry two 64 kb/s B-channels and one 16 kb/s D-channel thus creating a 2B+D data link. The B-channels carry digitally encoded speech or data and the D-channel carries control and signaling messages. In TCM, bursts of data are transmitted in "ping-pong" fashion every 125 microseconds between the KSU 10 and a terminal such as a key set 11. Delay and guard times prevent interferences between the receive and transmit bursts in the transceivers at the end of each data link; the delay time is limited by the maximum length of the link.

The provisioning of 2B+D bandwidth to every key set 11 supports enhanced telephone terminal design and functionality. For example, each key station set may have a character display which, by means of the associated D-channel, offers simplified access to system features, administration and control. The displays, sometimes in conjunction with context sensitive keys or softkeys, facilitate feature activations, present call status and feature information, confirm when operations have been correctly executed and identify and help to resolve invalid operations.

The Norstar software structure operates as a number of independent tasks which operate in parallel and communicate by means of a broadcast message system. There is an independent task for each line and terminal plus some service tasks which manage shared equipment and configuration data. Messages between tasks are known as Functional Messages and operate in accordance with a predetermined Protocol (FUMP). Tasks may run on the KSU processor in a round robin timeshared manner or may run on any terminal which has sufficient processing capacity. Underlying the task structure are programs to support the message system, allocate KSU processor time between the various tasks and communicate with the system hardware. A message generated by one task is broadcast to all other tasks whether these tasks operate on the KSU processor or on the terminals themselves. It is up to the functional level entities to filter the incoming messages.

Figure 2:
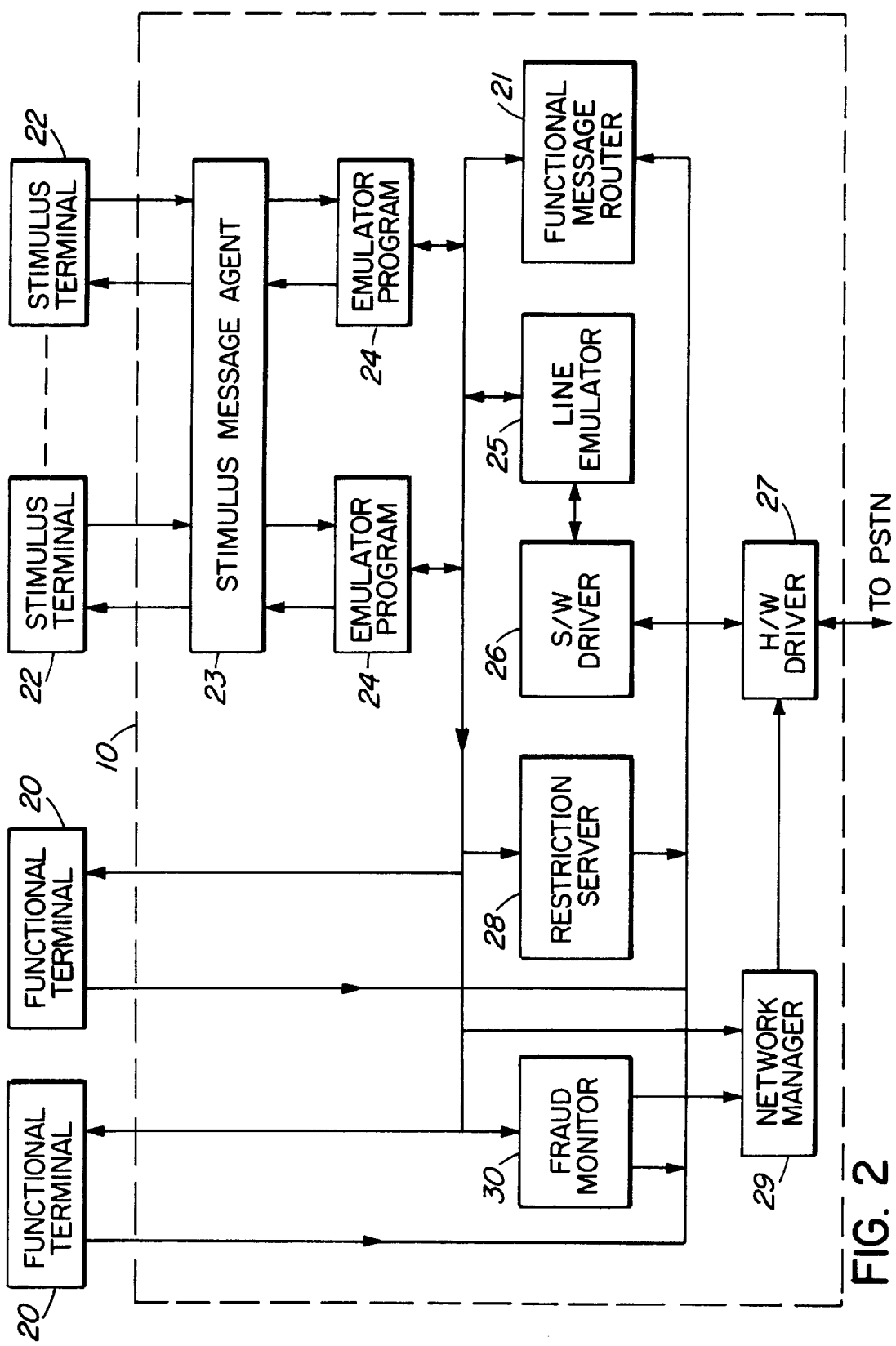
FIG. 2 is a block diagram of a portion of the key service unit illustrated in FIG. 1, showing the software blocks which contribute to the method of the invention.

FIG. 2 illustrates some of the logical blocks within the KSU 10 including the messaging system between the KSU 10 and the key sets as well as a fraud monitor in accordance with the invention. Two types of terminals may be connected to the ports of the KSU. A functional terminal 20 receives and transmits functional messages to and from the KSU 10 and follows the rules of FUMP; it contains its own program to make decisions. Functional messages from this type of set are sent over the D-channel to the functional message router 21 which broadcasts them on a bus to all sets and other units attached to the bus. Stimulus sets 22, by contrast, communicate with the KSU 10 via stimulus messages. The first few bytes of a stimulus message carry a distinctive pattern which is recognized by a stimulus message agent 23. It takes the message out of the normal stream and sends it directly to the appropriate KSU-resident emulator program 24 which is adapted to mimic a functional terminal with respect to functional messaging and to drive, via stimulus messages, a stimulus terminal; it causes stimulus messages to be sent back to the stimulus set 22 to activate lamps and tones. It also sends functional messages to the functional message router 21 which broadcasts them to all other sets on the system.

The core of the KSU 10 also comprises a line emulator 25, software and hardware drivers 26 and 27 respectively for providing communications between the messaging system and the PSTN as described in the aforementioned documents. A restriction server 28 is also connected to the D-channel bus to monitor the functional messages appearing thereon; it is comprised of a set of restrictions which define the constraints of access between terminals and outside line ports by users of the system. The server contains tables of restriction filters each applicable to predetermined groups of key sets. For example, the administrator of the system may wish to restrain a group of users from making calls outside the system; similarly, another group may be allowed to make calls to outside destinations but not toll calls, etc. As digits are dialed by a user, they are monitored by the restriction server which parses them one at a time and compares the dialed digits to the restriction filters for the particular user. When a restriction set is matched, the call may be denied as described below. The KSU 10 also comprises a network manager 29 connected to the messaging bus; it responds to predetermined messages to control the interconnection between parties connected to the ports of the system. For example, since the functional messages on the messaging bus contain source and destination information for any one call, the network manager is able to allocate communicating time slots on the time slot interchanger of the switch thus allowing two parties connected to respective ports of the KSU 10 to communicate. This process is described in detail in the aforementioned background documents.

Also shown in FIG. 2 is a toll fraud monitor 30 in accordance with the invention. In a manner similar to the restriction server 28 and using analysis or parsing information from the server 28 via the messaging bus, the server 28 monitors the call origination activity and responds thereto by allowing or disallowing each call to proceed to connection. In a radical departure from known practice, the fraud monitor is adapted to deny a call being originated until it is determined that it meets all the constraints associated with the terminal being used to originate the call.

Figure 3:
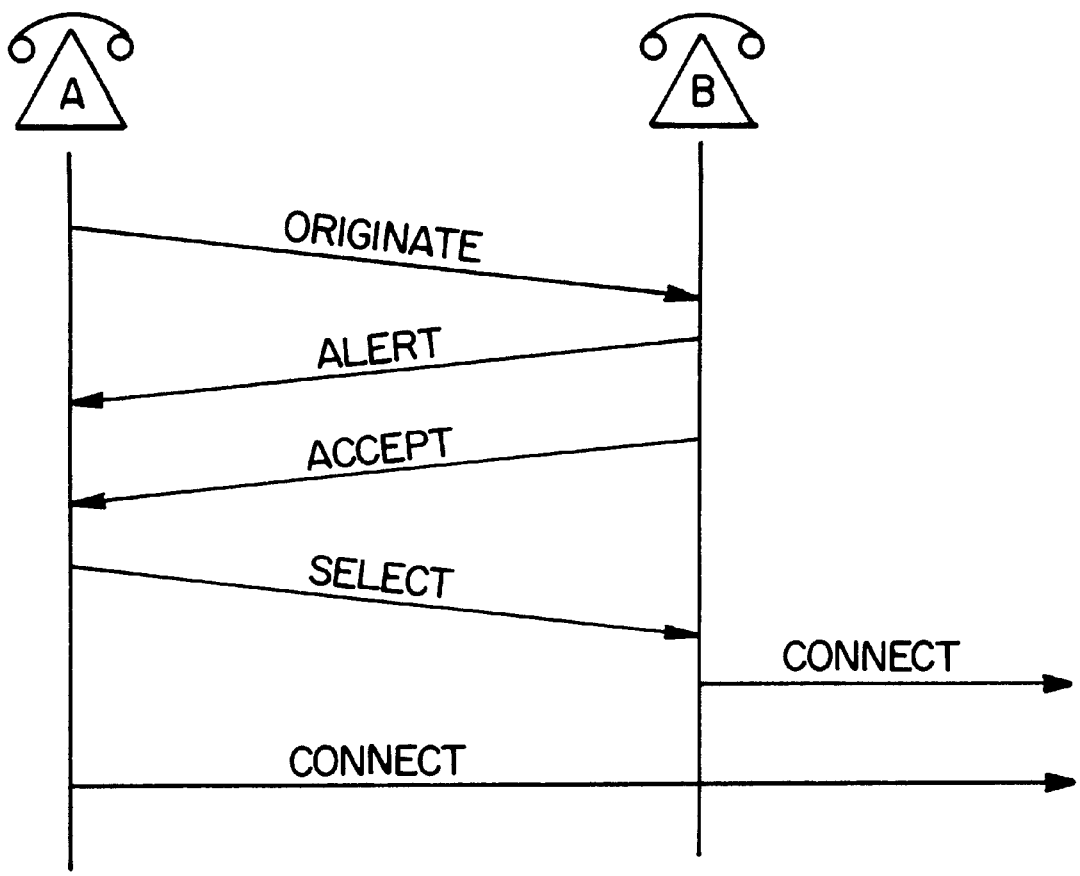
FIG. 3 is a diagram illustrating the sequence of messages generated in response to a request by a terminal for connection to another terminal.

FIG. 3 illustrates the sequence of messages that are generated when a call is set up in this system. When terminal A calls terminal B, A originates the call by sending a high-level functional message to B. Terminal B then starts ringing and confirms with A that it is alerting. When the user at B goes off-hook, a message is sent back informing A that the call has been accepted. Terminal A confirms the selection and the timeslot interchanger in the KSU establishes a voice connection between them. A call between a terminal and an outside line is achieved using the same sequence; however in this case, the line emulator program interfaces the outside line to the D-channel signaling bus. Like the stimulus-type key sets, lines have individual emulator programs and each line has a user number. To make an outside call, the user actuates a "line key" or other similar control. The calling set then broadcasts the line user number and the corresponding line emulator program responds. The user can then dial the digits of the outside telephone number. The digits are carried on the D-channel of the TCM link and are parsed to the line emulator program which in turn transmits them on the telephone line to the public network for call setup. As soon as the outside line is seized, the timeslot interchanger connects the selected subscriber line to the B-channel of the terminal involved in the connection thus providing a clear voice channel from the terminal to the central office.

As mentioned above, the system employs a broadcast technique; therefore, each control message initiated at one of the terminals or from an external line as well as from logical units attached to the messaging bus are routed to all entities attached to the bus. Each entity is responsible for identifying and receiving any message for which it is the destination.

As mentioned above, a key system user wishing to perpetrate a toll fraud takes advantage of the fact that in key systems, outside lines are effectively directly connected to a user's key set. On going off-hook and selecting an outside line, a user is provided with a dial tone and a clear path to the central office on which the outside subscriber line terminates. The perpetrator may then use a hand-held DTTF generator to generate a toll telephone number unbeknownst to the key system.

A more advanced key system may be provided with a timer that times out and terminates an outside line seizure unless a first digit is dialed on the keypad of the user's key set within a predetermined number of seconds. However, a perpetrator is still able to fraudulently place a toll call by, for example, dialing a "1" on his keypad and then use a hand-held DTMF generator to dial the remainder of the digits.

Yet more sophisticated key systems may be provided with a restriction server that parses the dialed digits and allows a call when restrictions associated with the dialed digits are non-existent. In fact, most contemporary systems are provided with a restriction server that limits predetermined groups of users to respective capabilities. However, all the known restriction filters operate on the basis of parsing a dialed sequence of digits by default. For example, if a restriction filter corresponds to the number "4167", the restriction server will not fail the digits "4", "1", "6" because it is still in parsing state between the digits and only when a "7" follows the sequence "416" will the server fail the restriction. This feature allows a user to, for example, dial a "0" which may be the first digit of a restricted sequence "011", converse with an operator while at the same time use his hand-held DTMF generator to dial a restricted code. The restriction server is in a parsing state and still awaits more digits before it is capable of validating a code or causing a call to be terminated.

FIG. 4 is a sequence chart illustrating a method of toll fraud prevention in accordance with the invention. A user may request access to an outside line in a variety of ways such as actuating a line key, using a line access code, etc. When such a request is generated, the fraud monitor reacts by monitoring the FUMP messages to determine if the source or requested destination of the call is associated with any restriction filter. If no, the fraud monitor returns to its quiescent status. If yes, the fraud monitor activates its fraud detection software and mutes the forward speech path from the KSU outward. This is achieved by a message from the fraud monitor to the network manager that instructs or prevents the latter from causing B-channel information from the set to be written in its allocated timeslot of the interchanger. The actual message may be as simple as setting a bit to a ONE in a pre-set message.

As mentioned above, the network manager is basically a giant state machine that keeps track of the call connection state of each port. To establish two-way speech paths between two ports, the network manager writes commands to hardware registers of connection devices that map to these ports. To mute a speech path, the network manager connects the source port to a port that provides silence tone. The monitor then "listens" for a first-dialed digit and will maintain that posture until it is received. At the same time that this activity is taking place, call-progress activity is also active; thus the sequence shown in this part of FIG. 4 is only exemplary and may vary depending on factors such as the load on the switch, whether the line request also activated a speed dialer, etc. Under all these scenarios, the digit monitoring operates, if not in real time, then on the dialed digits stored in registers. Whether the outside line is seized before, during or after the first digit is received is inconsequential since, at the time of seizure, the forward speech path has already been muted.

Each dialed digit is parsed by the restriction server and the received string of digits is compared to the restriction filters associated with the call. At the same time, each dialed digit causes an interdigital timer to be set. If the timer is allowed to reset or if any portion of the received dialed digit string fails a restriction filter, a call-deny FUMP message is generated and broadcast in the usual manner. The fraud monitor responds to the call-deny message by terminating the call and, via the network manager, unmuting the speech path that was previously muted. If desired, an appropriate message may be displayed on the terminal.

If the received string of digits does not fail any restriction filter associated with the call and the interdigital timer is not allowed to become reset during digit reception, the call is considered to be proper and is allowed to proceed in the conventional manner. The call monitor generates messages to cause the forward speech path to become unmuted and the timer to be reset. Of course, if a call in progress is dropped before completion, an unmute message is generated and the interdigital timer is reset. If the user terminal that originates a call is so-equipped, the visual display of the terminal may be updated as the call progresses.

The interdigital timer should be selected to have a duration that provides a comfortable period to the user before time-out. The duration should be less and, at most, equal to the digit timer at the CO so that the call is not released unnecessarily. It has been found that a time duration of about fifteen seconds was a suitable compromise.

Calling features such as conference, transfer, and camp-on allow more than two parties at one point of a call and thus increase the opportunity of perpetrating toll fraud. The problem may be obviated by assuming that if a third party becomes involved at any point of a call and all restrictions have not been passed, that a fraud situation is possible and therefore the call should be denied. On the other hand, other calls such as selective line redirection and tandem do not pose a fraud threat since a redirected line does not generate a fraud window and a tandem call is really a special two-party call. Therefore if a FUMP message indicating a transfer, re-route or conference feature is received before all restrictions are passed, the call will be released; otherwise, the call is allowed. On the other hand, it is possible as an optional procedure to recognize a conference request and to treat the subsequent process as a new call; that is, muting the forward speech path until all restrictions associated with the new call are passed.

A contemporary sophisticated key system such as the Norstar system may also be adapted to support wireless telephone sets. The KSU for such a system therefore also includes a software wireless driver in addition to a line driver. It is thus seen that such a system services three muting clients, the line driver, the wireless driver and the fraud monitor. These clients use the muting interfaces at various points of a call thus creating the possibility of contention in muting speech paths.

In order to prevent any interference from external sources, the line driver normally mutes both speech paths of a call whenever digits are being dialed out and unmutes them at the completion of the dialing.

As described above, some user ports on a key system are unfettered by restrictions whereas others are associated with restrictions as per stored information in a restriction server. The fraud monitor will mute the forward speech path when a line associated with at least one dialing filter is seized and will unmute it when a message is received from the restriction server indicating whether restrictions have been passed or not.

The wireless driver also needs to call a muting routine whenever a portable device is no longer associated with a fixed port device. Usually, this occurs during a wireless hand-off process when a portable moves from one cell to another. In this transition period, the portable device is really connected to two fixed port devices (cells) temporarily. Each cell is essentially competing for connections to the portable device and whichever one loses the bidding process will eventually be disconnected from the portable device. In a condition called "pre-connect unmuting", the wireless driver may invoke an unmuting routine even before connections between the portable and the fixed-port device have yet been established. The wireless driver expects the pre-connect unmuting request to be treated the same way as a normal unmuting request. Therefore, the muting state of the given node must be cleared in this case, else speech paths may not be properly connected.

In order to keep track and prevent contentions in muting amongst the requests from the various clients, the network manager is provided with a register having a data field called mute-record. The data field includes two bit fields that keep track of the muting state of both forward and incoming speech directions. Each bit field has two bits, one used by the fraud monitor and the other used by other clients such as wireless and line drivers. Alternatively, each bit field could have any number of bits, one for each possible client. Also, the mute-record register may be configured to represent priorities amongst the various clients.

The mute-record data field is controlled in accordance with the rule that whereas a speech path will be muted by a client under the circumstances described above, a speech path will only be unmuted if and only if there is only one bit in the mute-record register that is turned on and the bit corresponds to the task which currently wants to unmute.

As seen from the above description, the invention provides an effective method of preventing toll fraud in key telephone systems. It will of course be recognized that the invention can be realized using variations of the method and apparatus described above without departing from the scope and spirit of the invention.

We claim:

1. A method of preventing fraudulent toll calls by a key set user connected to a key telephone system, the system comprising a central switching unit having call processing elements, a first plurality of ports each of which is available for connection to a respective telephone line of a telephone switching facility, a second plurality of ports, each of which is available for connection of a user terminal thereto, each user terminal including an interface device for exchanging signals with the port in an operating signal format of the port, the central switching unit of the system comprising a messaging system for exchanging messages internally and externally with user terminals and telephone lines of the switching facility, a restriction server for parsing received digits dialed by a terminal user and comparing a received string of digits with pre-programmed restriction filters stored therein, the call processing elements comprising a network manager responsive to messages on a messaging bus for generating control messages and commands for setting-up and terminating calls, and a fraud monitor for controlling the fraud prevention process, the method comprising the steps of:

recognizing, from a user terminal, a message requesting the use of a telephone line to a switching facility;

determining the existence of at least one restriction filter associated with the user terminal that originated the use request of the telephone line;

if no restriction filter is associated with the requesting user terminal, processing the use request in the conventional manner;

if at least one restriction filter is associated with the user terminal that originated the use request, generating a message for activating a fraud prevention process comprising the further steps of:

at the central switching unit of the key system, allocating a speech path between the telephone line and a link to the user terminal requesting use of the telephone line and muting the forward speech path between the requesting user terminal and the telephone switching facility whereby the user is able to receive information from the switching facility but cannot transmit any information thereto;

monitoring a string of digits dialed by the user and evaluating whether or not the dialed digits meet the constraints of the restriction filters associated with the terminal; and if the constraints are met, allowing the call to proceed in the conventional manner and if the constraints are not met, terminating the call.

2. A method of preventing fraudulent toll calls by a key set user connected to a key telephone system as defined in claim 1 and comprising the further step of:

on reception of a first dialed digit and of each subsequent digit, setting an interdigital timer having a predetermined duration and if the timer is allowed to reset while the dialed digit string is being monitored, terminating the call which includes the steps of:

generating a message indicating that the call process is to be terminated; generating a message to cause the forward speech path to be unmuted; and resetting the interdigital timer.

3. A method of preventing fraudulent toll calls by a key set user connected to a key telephone system as defined in claim 2 wherein the speech path is allocated by loading a pair of corresponding registers in a switching mechanism, each register identifying one of, the link to the user terminal and the other, the telephone line to the switching facility, the muting step comprising the loading of the register identifying the link to the user terminal with information identifying the source of a silence tone.

4. A method of preventing fraudulent toll calls by a key set user connected to a key telephone system as defined in claim 3 wherein the unmuting step comprises the removing in the register of the information identifying the source of a silence tone.

5. A method of preventing fraudulent toll calls by a key set user connected to a key telephone system as defined in claim 3 wherein the network manager comprises a mute-record register for maintaining a record of muting activity by the clients of a call, the method comprising the further step of unmuting a speech path of a call if and only if there is only one bit in the mute-record register that is turned on and the bit corresponds to the task which is requesting the unmuting of the speech path.

6. A method of preventing fraudulent toll calls by a key set user connected to a key telephone system, the system comprising a central switching unit having call processing elements, a first plurality of ports each of which is available for connection to a respective telephone line of a telephone switching facility, a second plurality of ports, each of which is available for connection of a user terminal thereto, each user terminal including an interface device for exchanging signals with the port in an operating signal format of the port, the central switching unit of the system comprising a messaging system for exchanging messages internally and externally with user terminals and telephone lines of the switching facility, a restriction server for parsing received digits dialed by a terminal user and comparing a received string of digits with pre-programmed restriction filters stored therein, the call processing elements comprising a network manager responsive to messages on a messaging bus for generating control messages and commands for setting-up and terminating calls, and a fraud monitor for controlling the fraud prevention process, the method comprising the steps of:

recognizing, from a user terminal, a message requesting the use of a telephone line to a switching facility;

at the central switching unit of the key system, allocating a speech path between the telephone line and a link to the user terminal requesting use of the telephone line;

muting the forward speech path between the requesting user terminal and the telephone switching facility whereby the user is able to receive information from the switching facility but cannot transmit any information thereto; and on seizure of the telephone line and on reception of each dialed digit, setting an interdigital timer having a predetermined duration and if the timer is allowed to reset before an expected plurality of dialed digits is received, terminating the call.

7. A method of preventing fraudulent toll calls by a key set user connected to a key telephone system as defined in claim 6 wherein the terminating step includes the steps of:

generating a message indicating that the call process is to be terminated;

generating a message to cause the forward speech path to be unmuted; and resetting the interdigital timer.

8. A method of preventing fraudulent toll calls by a key set user connected to a key telephone system as defined in claim 7 wherein the speech path is allocated by loading a pair of corresponding registers in a switching mechanism, each register identifying one of, the link to the user terminal and the other, the telephone line to the switching facility, the muting step comprising the loading of the register identifying the link to the user terminal with information identifying the source of a silence tone.

9. A method of preventing fraudulent toll calls by a key set user connected to a key telephone system as defined in claim 8 wherein the unmuting step comprises the removing in the register of the information identifying the source of a silence tone.

10. A method of preventing fraudulent toll calls by a key set user connected to a key telephone system as defined in claim 9 wherein the network manager comprises a mute-record register for maintaining a record of muting activity by the clients of a call, the method comprising the further step of unmuting a speech path of a call if and only if there is only one bit in the mute-record register that is turned on and the bit corresponds to the task which is requesting the unmuting of the speech path.

11. A method of preventing fraudulent toll calls by a key set user connected to a key telephone system as defined in claim 6 and comprising the further steps of:

following the recognition from a user terminal of a message requesting the use of a telephone line to a switching facility, determining the existence of at least one restriction filter associated with the user terminal that originated the use request of the telephone line;

if at least one restriction filter is associated with the use request, monitoring a string of digits dialed by the user and evaluating whether or not the dialed digits meet the constraints of the restriction filters associated with the terminal; and if the constraints are met, allowing the call to proceed in the conventional manner and if the constraints are not met, terminating the call.

12. Apparatus for preventing fraudulent toll calls by a key set user connected to a key telephone system, the system comprising a central switching unit having call processing elements, a first plurality of ports each of which is available for connection to a respective telephone line of a telephone switching facility, a second plurality of ports, each of which is available for connection of a user terminal thereto, each user terminal including an interface device for exchanging signals with the port in an operating signal format of the port, the central switching unit of the system comprising a messaging system for exchanging messages internally and externally with user terminals and telephone lines of the switching facility, a restriction server for parsing received digits dialed by a terminal user and comparing a received string of digits with pre-programmed restriction filters stored therein, the call processing elements comprising a network manager responsive to messages on a messaging bus for generating control messages and commands for setting-up and terminating calls, and a fraud monitor for controlling the fraud prevention process, means for recognizing a message from a user terminal requesting the use of a telephone line to a switching facility, means for determining the existence of at least one restriction filter associated with the user terminal that originated the use request of the telephone line, means for allocating a speech path between the telephone line and a link to the user terminal requesting use of the telephone line, means responsive to the determining means for muting the forward speech path between the requesting user terminal and the telephone switching facility if at least one restriction filter was determined to exist, the restriction server including means for monitoring a string of dialed digits and evaluating whether or not the dialed digits meet the constraints of the restriction filters associated with the use request, and means responsive to the monitoring and evaluating means for generating a first message allowing the call to proceed in the conventional manner if the constraints are met and a second message for terminating the call if the constraints are not met.

13. Apparatus for preventing fraudulent toll calls by a key set user connected to a key telephone system as defined in claim 12 wherein the network manager further comprises a mute-record register for maintaining a record of muting activity by the clients of a call.

14. Apparatus for preventing fraudulent toll calls by a key set user connected to a key telephone system, the system comprising a central switching unit having call processing elements, a first plurality of ports each of which is available for connection to a respective telephone line of a telephone switching facility, a second plurality of ports, each of which is available for connection of a user terminal thereto, each user terminal including an interface device for exchanging signals with the port in an operating signal format of the port, the central switching unit of the system comprising a messaging system for exchanging messages internally and externally with user terminals and telephone lines of the switching facility, a restriction server for parsing received digits dialed by a terminal user and comparing a received string of digits with pre-programmed restriction filters stored therein, the call processing elements comprising a network manager responsive to messages on a messaging bus for generating control messages and commands for setting-up and terminating calls, and a fraud monitor for controlling the fraud prevention process, means for recognizing from a user terminal a message requesting the use of a telephone line to a switching facility, the central switching unit of the key system comprising means for allocating a speech path between the telephone line and a link to the user terminal requesting use of the telephone line, the network manager including means for muting the forward speech path between the requesting user terminal and the telephone switching facility whereby the user is able to receive information from the switching facility but cannot transmit any information thereto, an interdigital timer having a predetermined duration, and means responsive to the seizure of the telephone line and to each dialed digit for again setting the timer whereby if the timer is allowed to become reset while dialed digits are still being monitored, the call is terminated.

15. Apparatus for preventing fraudulent toll calls by a key set user connected to a key telephone system as defined in claim 14 wherein the network manager further comprises a mute-record register for maintaining a record of muting activity by the clients of a call.

* * * * *